US012732023B2

(12) United States Patent
Shim

(10) Patent No.: US 12,732,023 B2
(45) Date of Patent: Sep. 8, 2026

(54) MOBILITY LIGHTING APPARATUS AND MOBILITY DEVICE

(71) Applicants: HYUNDAI MOTOR COMPANY, Seoul (KR); KIA CORPORATION, Seoul (KR)

(72) Inventor: Joon Bo Shim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/256,900

(22) Filed: Jul. 1, 2025

(65) Prior Publication Data

US 2026/0221808 A1 Jul. 30, 2026

(30) Foreign Application Priority Data

Jan. 24, 2025 (KR) ........................ 10-2025-0011080

(51) Int. Cl.

| | |
|---|---|
| ***H02J 50/10*** | (2016.01) |
| ***B60Q 1/00*** | (2006.01) |
| ***B60Q 1/22*** | (2006.01) |
| ***B60Q 1/30*** | (2006.01) |
| ***F21V 23/02*** | (2006.01) |
| ***H02J 50/00*** | (2016.01) |
| ***H02J 50/12*** | (2016.01) |
| ***H02J 50/80*** | (2016.01) |

(52) U.S. Cl.

CPC .............. *H02J 50/10* (2016.02); *F21V 23/02* (2013.01); *H02J 50/005* (2020.01); *H02J 50/80* (2016.02); *B60Q 1/0041* (2013.01); *B60Q 1/22* (2013.01); *B60Q 1/30* (2013.01); *B60Q 1/3015* (2022.05); *B60Q 1/303* (2022.05); *H02J 50/12* (2016.02)

(58) Field of Classification Search

CPC .......... H02J 50/005; H02J 50/10; H02J 50/12; H02J 50/80

See application file for complete search history.

(56) References Cited

U.S. PATENT DOCUMENTS

| | | | | |
|---|---|---|---|---|
| 9,346,397 | B2 * | 5/2016 | Gergets | B60Q 1/2611 |
| 2011/0309688 | A1 * | 12/2011 | Yamazaki | H02J 50/40 307/104 |
| 2019/0364648 | A1 * | 11/2019 | Yokobori | H05B 47/185 |

FOREIGN PATENT DOCUMENTS

| | | | | |
|---|---|---|---|---|
| JP | 2000255342 A | * | 9/2000 | |
| KR | 20180062100 A | * | 6/2018 | H02J 50/12 |

(Continued)

OTHER PUBLICATIONS

Machine translation of KR 20180062100 A retrieved from the FIT database of PE2E search. (Year: 2025).*

(Continued)

*Primary Examiner* — Colin J Cattanach
(74) *Attorney, Agent, or Firm* — MCDONNELL BOEHNEN HULBERT & BERGHOFF LLP

(57) ABSTRACT

A mobility device lighting apparatus includes a light emission portion, a light emission driver configured to drive the light emission portion, a power transmitter configured to convert pre-conversion power into power for wireless power transmissions, and a wireless power transmission coil portion configured to receive the power for wireless power transmissions from the power transmitter.

20 Claims, 11 Drawing Sheets

(56) References Cited

FOREIGN PATENT DOCUMENTS

| | | | | | |
|---|---|---|---|---|---|
| KR | 20180065238 A | * | 6/2018 | .............. | H02J 50/12 |
| KR | 20180077477 A | * | 7/2018 | ........... | B60Q 1/0041 |

OTHER PUBLICATIONS

Machine translation of JP 2000255342 A retrieved from the FIT database of PE2E search. (Year: 2025).*
Machine translation of KR 20180065238 A retrieved from the FIT database of PE2E search. (Year: 2025).*
Machine translation of KR 20180077477 A retrieved from the FIT database of PE2E search. (Year: 2025).*

* cited by examiner

MOBILITY LIGHTING APPARATUS AND MOBILITY DEVICE

CROSS REFERENCE TO RELATED APPLICATIONS

This application claims benefit of priority to Korean Patent Application No. 10-2025-0011080 filed on Jan. 24, 2025 in the Korean Intellectual Property Office, the disclosure of which is incorporated herein by reference in its entirety.

BACKGROUND

1. Field

The present disclosure relates to a mobility device lighting apparatus and a mobility device.

2. Description of Related Art

Generally, mobility devices such as vehicles may include lighting apparatuses to enhance visual recognizability of surroundings thereof. For example, lighting apparatuses may be implemented as headlamps, fog lights, turn signals, brake lights, tail lights, or the like.

A lighting apparatus may operate by receiving power from a mobility device, and the mobility device may control an ON/OFF state of the lighting apparatus. To this end, the lighting apparatus may need to have a structure (for example, a wire connection structure) for receiving power and a control signal from the mobility device for light emissions.

Recently, a structure of a lighting apparatus may be designed in various manners depending on a type or model of a mobility device, and increasingly higher performance requirements (for example, an improved degree of shape freedom, a reduced size, or reduced power consumption) have been required. Consequently, the difficulty of implementing the wire connection structure (or the difficulty of securing performance) may gradually increase, and the wire connection structure may become a limitation in improving the performance of the lighting apparatus.

SUMMARY

In a mobility device lighting apparatus and a mobility device according to an example embodiment of the present disclosure, a wire connection structure for light emission may be omitted or reduced, such that a degree of design freedom may be increased, or the mobility device lighting apparatus and the mobility device may be advantageously implemented with a reduced size (and/or cost).

According to an aspect of the present disclosure, there is provided a mobility device lighting apparatus including a light emission portion, a light emission driver configured to drive the light emission portion, a power transmitter configured to convert pre-conversion power into power for wireless power transmissions, and a wireless power transmission coil portion configured to receive the power for wireless power transmissions from the power transmitter.

For example, the wireless power transmission coil portion may be disposed to output a magnetic field in a direction, different from a light emission direction of the light emission portion.

For example, the light emission portion may have one surface outputting light. The other surface of the light emission portion may surround the light emission driver, the power transmitter, and the wireless power transmission coil portion. The wireless power transmission coil portion may be disposed at one edge of the other surface of the light emission portion so as to output a magnetic field in a direction, not parallel to a light emission direction of one edge of the light emission portion.

For example, the wireless power transmission coil portion may include a wireless power transmission coil configured to output a magnetic field, and a mount disposed to overlap the wireless power transmission coil in a magnetic field output direction of the wireless power transmission coil, the mount having a seating support portion on one surface of the mount.

For example, the seating support portion may protrude to an edge of a seating space on the one surface of the mount and the seating support portion may be disposed to cover the edge of the seating space.

For example, the wireless power transmission coil may be embedded in the mount. A lead-out end of the wireless power transmission coil may be lead out from the inside of the mount to the outside of the mount.

For example, the mobility device lighting apparatus may further include a mobility device connector configured to receive a first control signal and the pre-conversion power from a mobility device. The light emission driver may be configured to drive the light emission portion, based on the first control signal.

For example, the mobility device connector may be configured to further receive a second control signal from the mobility device. The wireless power transmission coil portion may be configured to output a magnetic field for transmitting the second control signal.

For example, the power transmitter may be configured to modulate the power for wireless power transmissions by at least one of an amplitude, a frequency, or a phase corresponding to the second control signal such that the wireless power transmission coil portion transmits the power for wireless power transmissions and the second control signal together.

For example, the power transmitter may be configured to sense a load of the wireless power transmission coil portion, to select, based on a load sensing result, one of a wireless charging control mode and a wireless emission control mode, and to determine whether to transmit the second control signal through the wireless power transmission coil portion according to mode selection.

For example, the power transmitter may be configured to sense a load of the wireless power transmission coil portion, to select, based on a load sensing result, one of a wireless charging control mode and a wireless emission control mode, and to convert the pre-conversion power into the power for wireless power transmissions according to a preset specification corresponding to a selected mode.

According to another aspect of the present disclosure, there is provided a mobility device lighting apparatus including a wireless power reception coil portion configured to receive power and a control signal through wireless power transmission, a power receiver configured to receive the power from the wireless power reception coil portion and to convert the power into converted power, a light emission portion configured to emit light, based on the power converted by the power receiver, and a light emission driver configured to drive the light emission portion, based on the control signal.

For example, the wireless power reception coil portion may be disposed to receive the power and the control signal in a direction, not parallel to a light emission direction of the light emission portion.

For example, the power receiver may be configured to detect at least one of an amplitude, a frequency, or a phase of the power received by the wireless power reception coil portion to receive the control signal.

For example, the power receiver may be configured to modulate a load of the wireless power reception coil portion in response to the power received from the wireless power reception coil portion.

According to another aspect of the present disclosure, there is provided a mobility device including a fixed part including a primary mobility device lighting apparatus, and a moving part including a secondary mobility device lighting apparatus. The primary mobility device lighting apparatus may include a power transmitter configured to convert pre-conversion power into power for wireless power transmissions, and a wireless power transmission coil portion configured to receive the power for wireless power transmissions from the power transmitter. The secondary mobility device lighting apparatus may include a wireless power reception coil portion magnetically coupled to the wireless power transmission coil portion to receive the power for wireless power transmissions, and a power receiver configured to receive the power for wireless power transmissions from the wireless power reception coil portion and to convert the power for wireless power transmissions into converted power.

For example, the mobility device may include a controller configured to output a first control signal and a second control signal to the primary mobility device lighting apparatus. The primary mobility device lighting apparatus may further include a mobility device connector configured to receive the first control signal and the second control signal. The wireless power transmission coil portion may be configured to transmit the second control signal to the wireless power reception coil portion.

For example, the power transmitter may be configured to modulate the power for wireless power transmissions by at least one of an amplitude, a frequency, or a phase corresponding to the second control signal such that the wireless power transmission coil portion transmits the power for wireless power transmissions and the second control signal together. The power receiver may be configured to detect at least one of an amplitude, a frequency, or a phase of the power for wireless power transmissions to receive the second control signal.

For example, the power receiver may be configured to modulate a load of the wireless power reception coil portion in response to the power for wireless power transmissions received from the wireless power reception coil portion. The power transmitter may be configured to sense a load of the wireless power transmission coil portion, to select, based on a load sensing result, one of a wireless charging control mode and a wireless emission control mode, to determine whether to transmit the second control signal through the wireless power transmission coil portion according to mode selection, and to convert the pre-conversion power into the power for wireless power transmissions according to a preset specification corresponding to a selected mode.

For example, the primary mobility device lighting apparatus may be disposed to output light to the rear of the mobility device. The moving part may move so as to determine whether to open an internal space of the mobility device. The wireless power reception coil portion may be disposed such that whether the wireless power reception coil portion is magnetically coupled to the wireless power transmission coil portion varies depending on the movement of the moving part.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Various modifications may be made to the example embodiments. Here, the example embodiments should not be construed as being limited to the present disclosure and should be understood to include all changes, equivalents, and replacements within the idea and the technical scope of the disclosure.

The terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this disclosure, specify the presence of stated features, integers, operations, operations, elements, components or a combination thereof, but do not preclude the presence or addition of one or more other features, integers, operations, operations, elements, components, and/or groups thereof.

Unless otherwise defined herein, all terms used herein, including technical or scientific terms, have the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

As used herein, a vehicle (including an electric vehicle) refers to various vehicles transporting a transported object such as a person, animal, or object from a starting point to a destination. Such vehicles are not limited to vehicles travelling on roads or tracks.

Hereinafter, example embodiments of the present disclosure will be described in more detail with reference to the accompanying drawings.

Figure 1:
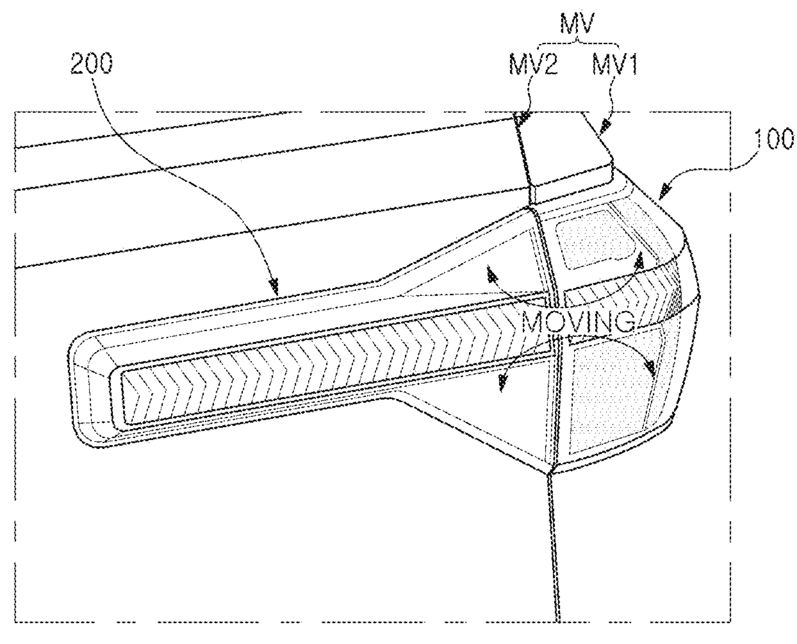
FIG. 1 is a perspective view of a mobility device lighting apparatus and a mobility device according to an example embodiment of the present disclosure.
Figure 2:
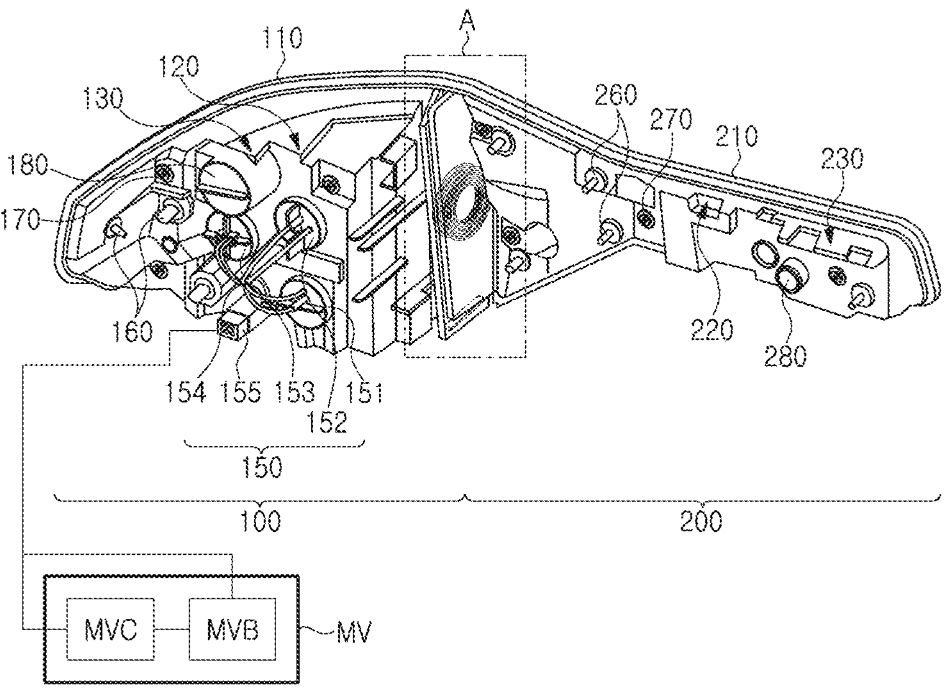
FIG. 2 is a perspective view of a primary and a secondary of a mobility device lighting apparatus according to an example embodiment of the present disclosure.

Referring to FIGS. 1 and 2, a mobility device MV according to an example embodiment of the present disclosure may include a fixed part MV1 including a (primary) mobility device lighting apparatus 100 and a moving part MV2 including a (secondary) mobility device lighting apparatus 200.

For example, the mobility device MV may be a vehicle, but the mobility device MV is not limited to an air mobility device, moving in the air, or a mobility device, moving in other types of spaces (for example, underground or underwater).

For example, the (primary) mobility device lighting apparatus 100 may be disposed to output light to the rear of the mobility device MV (for example, disposed in a rear lamp position of the vehicle), but the present disclosure is not limited thereto. The rear of the mobility device MV may refer to a direction, opposite to a main movement direction of the mobility device MV. For example, the fixed part MV1 may be included in at least one of a body frame, a side outer panel, and a front end module (FEM) of the vehicle, but the present disclosure is not limited thereto.

The moving part MV2 may move so as to determine whether to open an internal space (for example, a trunk or a frunk) of the mobility device MV. For example, the moving part MV2 may be included in one of a tailgate, a hood, and a door of the vehicle, but the present disclosure is not limited thereto.

In the mobility device MV according to an example embodiment of the present disclosure, even when the moving part MV2 moves, a power (and/or a control signal) transmission path to the moving part MV2 may be stably secured. For example, when the transmission path is implemented to have a wire connection structure, the wire connection structure may be implemented inefficiently (and/or unstably) in consideration of the movement of the moving part MV2, or may restrict the movement of the moving part MV2. In the mobility device MV according to an example embodiment of the present disclosure, the power (and/or the control signal) transmission path to the moving part MV2 may be stably secured while the wire connection structure is omitted or reduced.

Referring to FIG. 2, the (primary and secondary) mobility device lighting apparatuses 100 and 200 according to an example embodiment of the present disclosure may include light emission portions 110 and 210 and/or light emission drivers 120 and 220. Depending on a design thereof, the (primary and secondary) mobility device lighting apparatuses 100 and 200 may further include at least one of coupling units 160 and 260 coupling the mobility device lighting apparatuses 100 and 200 to the mobility device MV, an assembly support unit 170 supporting internal assembly structures of the mobility device lighting apparatuses 100 and 200, and a setting support unit 180 supporting user settings for the mobility device lighting apparatuses 100 and 200.

The light emission portions 110 and 210 may output light in a normal direction of one surfaces of the light emission portions 110 and 210. The other surfaces of the light emission portions 110 and 210 may be configured not to output light. For example, the light emission portions 110 and 210 may include a plurality of light emission diodes arranged on the one surfaces of the light emission portions 110 and 210, and the plurality of light emission diodes may be electrically connected to the light emission drivers 120 and 220.

The light emission drivers 120 and 220 may drive the light emission portions 110 and 210, and may be electrically connected to the light emission portions 110 and 210. For example, the light emission drivers 120 and 220 may drive the light emission portions 110 and 210 by outputting a current and/or a voltage to the light emission portions 110 and 210 so as to determine whether the light emission portions 110 and 210 output light (and/or light output intensity) during a specific period according to a control signal.

Figure 3:
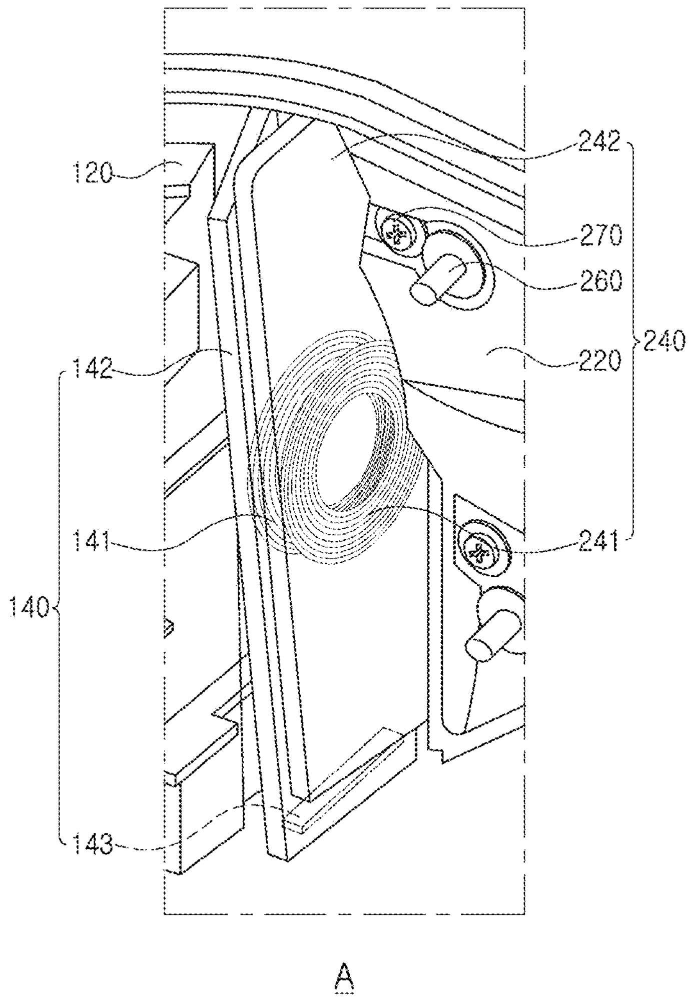
FIG. 3 is an enlarged perspective view of a wireless power transmission coil portion and a wireless power reception coil portion in FIG. 2.
Figure 4:
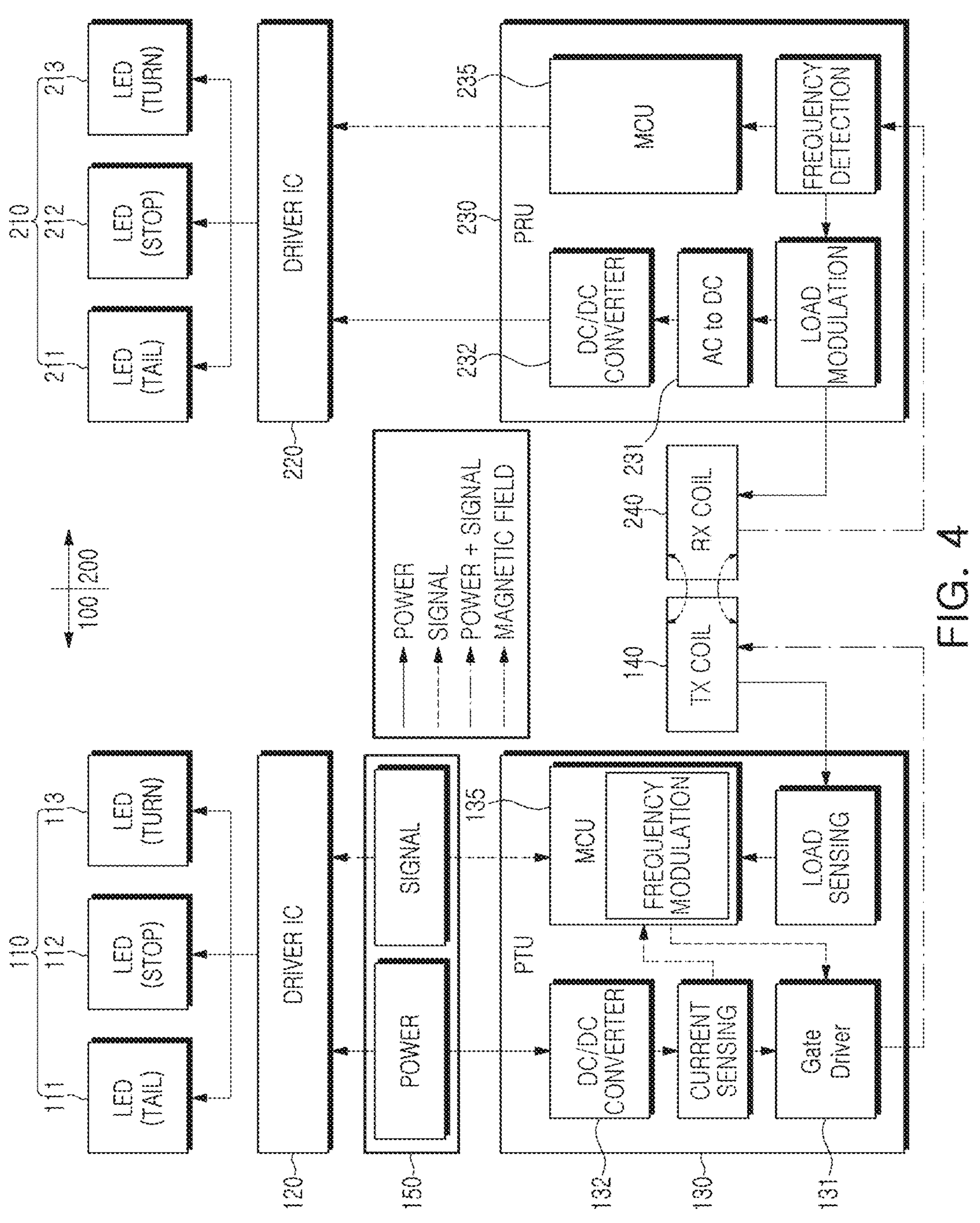
FIG. 4 is a block diagram of wireless power transmission between a primary and a secondary of a mobility device lighting apparatus according to an example embodiment of the present disclosure.

Referring to FIGS. 2 to 4, the (primary) mobility device lighting apparatus 100 according to an example embodiment of the present disclosure may further include a power transmitter 130 and/or a wireless power transmission coil portion 140.

The power transmitter (PTU) 130 may convert pre-conversion power POWER into power for wireless power transmissions. For example, the power transmitter 130 may include at least one of a gate driver 131, a DC/DC converter 132, and a controller 135. For example, the DC/DC converter 132 may convert (for example, step-up or step-down) a voltage of the pre-conversion power POWER, a direct current (DC), and the gate driver 131 may include an inverter converting DC power output by the DC/DC converter 132 into AC power. The power transmitter 130 may output the AC power as power for wireless power transmissions. The controllers 135 and 235 may be implemented as at least one of a microcontroller (MCU), an embedded system, a system-on-chip, and a system-in-package, but the present disclosure is not limited thereto.

The wireless power transmission coil portion 140 may receive power for wireless power transmissions from the power transmitter 130. The wireless power transmission coil portion 140 may be magnetically coupled to a wireless power reception coil portion 240, thereby transmitting power for wireless power transmissions to the wireless power reception coil portion 240 in an electromagnetic induction manner.

Accordingly, the wireless power transmission coil portion 140 may form the power (and/or the control signal) transmission path to the wireless power reception coil portion 240 without the wire connection structure. That is, the (primary) mobility device lighting apparatus 100 may stably supply power (and/or a control signal) to the (secondary) mobility device lighting apparatus 200 even when the (primary) mobility device lighting apparatus 100 is not fixedly coupled to the (secondary) mobility device lighting apparatus 200.

For example, the wireless power transmission coil portion 140 may be disposed to output a magnetic field in a direction (for example, a vertical direction, an oblique direction, or an opposite direction), different from a light emission direction (for example, a normal direction of one surface of the light emission portion) of the light emission portion 110. For example, the wireless power transmission coil portion 140 may be disposed on a flange in which the (primary and secondary) mobility device lighting apparatuses 100 and 200 oppose each other.

For example, the light emission portion 110 may have one surface outputting light, and the other surface of the light emission portion 110 may surround the light emission driver 120, the power transmitter 130, and the wireless power transmission coil portion 140. The wireless power transmission coil portion 140 may be disposed at one edge of the other surface of the light emission portion 110 to output a magnetic field in a direction (for example, a vertical direction or an oblique direction), not parallel to a light emission direction of one edge of the one surface of the light emission portion 110.

Referring to FIGS. 2 to 4, the (secondary) mobility device lighting apparatus 200 according to an example embodiment of the present disclosure may further include a power receiver (PRU) 230 and/or the wireless power reception coil portion 240.

The wireless power reception coil portion 240 may receive power and a second control signal through wireless power transmission. The wireless power reception coil portion 240 may be magnetically coupled to the wireless power transmission coil portion 140 to receive power for wireless power transmissions. Accordingly, the wireless power reception coil portion 240 may form the power (and/or the control signal) transmission path from the wireless power transmission coil portion 140 without the wire connection structure. That is, the (secondary) mobility device lighting apparatus 200 may stably receive power (and/or a control signal) from the (primary) mobility device lighting apparatus 100 even when the (secondary) mobility device lighting apparatus 200 is not fixedly coupled to the (primary) mobility device lighting apparatus 100.

The power receiver 230 may receive power for wireless power transmissions from the wireless power reception coil portion 240, and may convert the power for wireless power transmissions into converted power. For example, the power receiver 230 may include an AC-to-DC converter 231 and/or a DC/DC converter 232. For example, the AC-to-DC converter 231 may be implemented as a rectifier, and may convert AC power of the power for wireless power transmissions into DC power. For example, the DC/DC converter 232 may convert (for example, step-up or step-down) a voltage of the DC power output by the AC-to-DC converter 231. The power receiver 230 may output the DC power to the light emission portion 210 and/or the light emission driver 220.

For example, the wireless power reception coil portion 240 may be disposed to receive power and a second control signal in a direction (for example, a vertical direction or an oblique direction), not parallel to a light emission direction of the light emission portion 210. For example, the wireless power reception coil portion 240 may be disposed on a flange in which the (primary and secondary) mobility device lighting apparatuses 100 and 200 oppose each other. The wireless power reception coil portion 240 may be disposed such that whether the wireless power reception coil portion 240 is magnetically coupled to the wireless power transmission coil portion 140 varies depending on the moving part (MV2 in FIG. 1).

Referring to FIGS. 2 and 4, the mobility device MV may include a controller MVC outputting first and/or second control signals SIGNAL to the (primary) mobility device lighting apparatus 100, and a battery MVB outputting the pre-conversion power POWER to the (primary) mobility device lighting apparatus 100.

For example, the controller MVC may be implemented as a computing device (including a processor, a memory, a storage, an input/output device and a communication device) or an electronic control unit (ECU). The controller MVC may manually generate the first and/or second control signals SIGNAL according to a driver input of the mobility device MV, or may automatically generate the first and/or second control signals SIGNAL as a sensing value of a sensor in the mobility device MV satisfies a predetermined condition. The battery MVB may supply power to the controller MVC, and may satisfy overall power demands of the mobility device MV.

The (primary) mobility device lighting apparatus 100 may further include a mobility device connector 150 receiving the first and/or second control signal SIGNAL from the controller MVC of the mobility device MV. The mobility device connector 150 may receive the pre-conversion power POWER from the battery MVB of the mobility device MV.

For example, the mobility device connector 150 may include a plurality of branch connectors 151, 152, and 153 connected to the light emission driver 120 and the power transmitter 130, may include an integrated connector 155 connected to the mobility device MV, and may include a plurality of wires 154 integrally connecting the plurality of branch connectors 151, 152, and 153 to the integrated connector 155.

The light emission driver 120 may receive the pre-conversion power POWER to output a current, and may output a current for driving the light emission portion 110, based on the first control signal SIGNAL. For example, the light emission portion 110 may include a plurality of light emitting diodes 111, 112, and 113 corresponding to a tail TAIL, a stop STOP, and a turn TURN, and the first control signal SIGNAL may include information for determining an ON/OFF state of each of the plurality of light emitting diodes 111, 112, and 113. For example, the number of ON/OFF cases of N (N is a natural number) light emitting diodes 111, 112, and 113 may be $2^N$, and the information for determining the ON/OFF state may be implemented as N bits.

The gate driver 131 and/or the DC/DC converter 132 of the power transmitter 130 may convert (for example, voltage-change and/or DC-AC-convert) the pre-conversion power POWER and output power for wireless power transmissions to the wireless power transmission coil portion 140. In this case, the controller 135 of the power transmitter 130 may sense (feedback) currents of the gate driver 131 and/or the DC/DC converter 132 to control conversion operations of the gate driver 131 and/or the DC/DC converter 132.

The wireless power transmission coil portion 140 may transmit the power for wireless power transmissions to the wireless power reception coil portion 240. In this case, the controller 135 of the power transmitter 130 may receive the second control signal SIGNAL, and may transmit the second control signal SIGNAL to the wireless power reception coil portion 240 through the wireless power transmission coil portion 140. That is, the wireless power transmission coil portion 140 may output a magnetic field for transmitting the second control signal SIGNAL.

For example, the controller 135 of the power transmitter 130 may modulate the power for wireless power transmissions by at least one of an amplitude, a frequency, or a phase corresponding to the second control signal SIGNAL such that the wireless power transmission coil portion 140 transmits the power for wireless power transmissions and the second control signal SIGNAL together. Accordingly, the number of wireless power transmission coils 140 required to transmit the power for wireless power transmissions and the second control signal SIGNAL may be reduced to one, thereby reducing a size of the (primary) mobility device lighting apparatus 100 and/or costs required to implement the (primary) mobility device lighting apparatus 100.

For example, the controller 235 of the power receiver 230 may detect at least one of an amplitude, a frequency, or a phase of the power for wireless power transmissions received by the wireless power reception coil portion 240 to receive (receive information) the second control signal SIGNAL. Accordingly, the number of wireless power reception coil portions 240 required to receive the power for wireless power transmissions and the second control signal SIGNAL may be reduced to one, thereby reducing a size of the (secondary) mobility device lighting apparatus 200 and/or costs required to implement the (secondary) mobility device lighting apparatus 200.

The AC-to-DC converter 231 and/or the DC/DC converter 232 of the power receiver 230 may convert (for example, voltage-change and/or AC-DC-convert) the power for wireless power transmissions. In this case, the controller 235 of the power receiver 230 may sense (feedback) currents of the AC-to-DC converter 231 and/or the DC/DC converter 232 to control conversion operations of the AC-to-DC converter 231 and/or the DC/DC converter 232.

The light emission driver 220 may receive the power converted by the power reception unit 230 to output a current, and may output a current for driving the light emission portion 210, based on the second control signal SIGNAL. For example, the light emission portion 210 may include a plurality of light emitting diodes 211, 212, and 213 corresponding to a tail TAIL, a stop, and a turn TURN, and the second control signal SIGNAL may include information for determining an ON/OFF state of each of the plurality of light emitting diodes 211, 212, and 213. For example, the number of ON/OFF cases of N (N is a natural number) light emitting diodes 211, 212, and 213 may be $2^N$, and the information for determining the ON/OFF state may be implemented as N bits.

Figure 6:
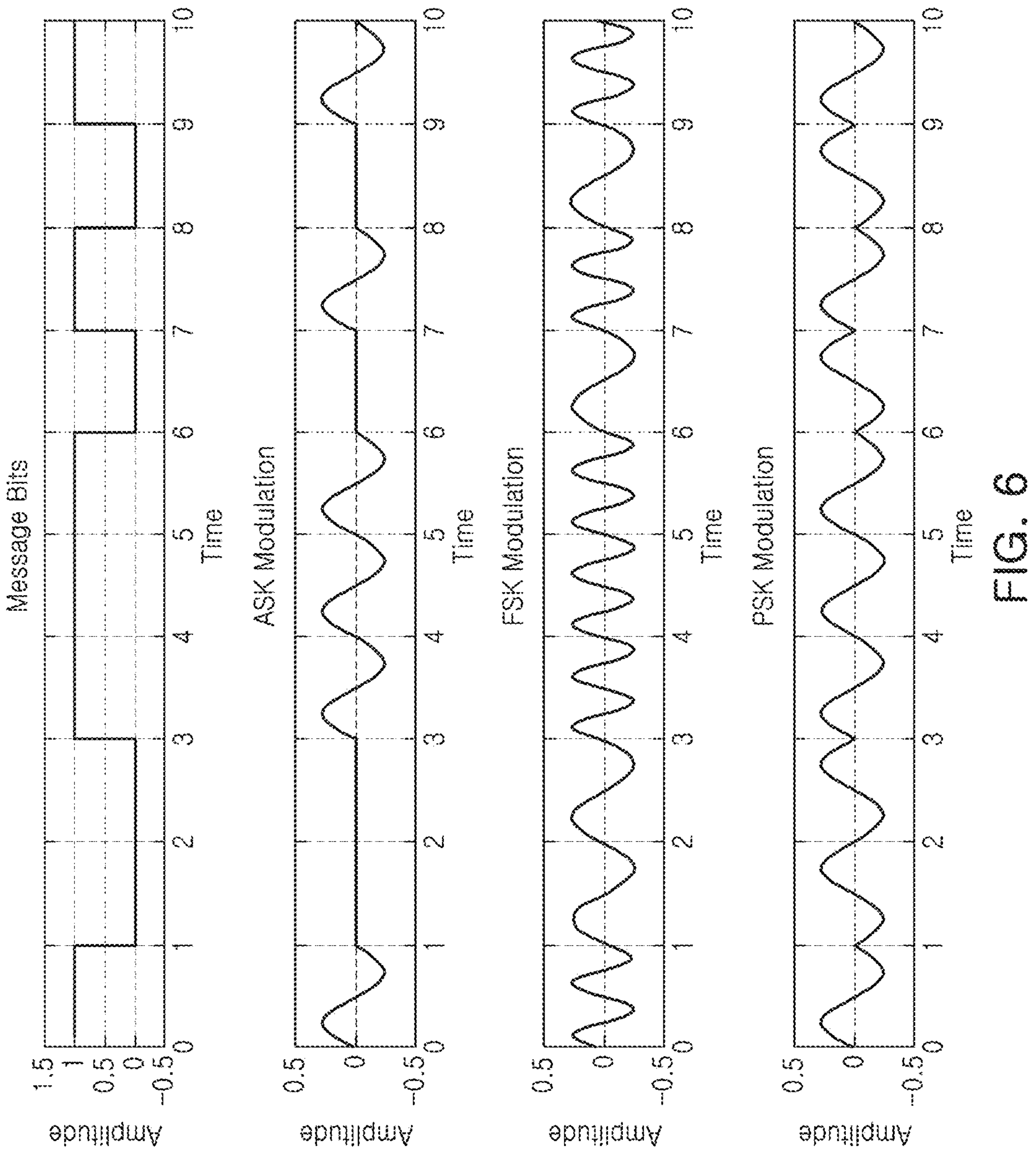
FIG. 6 is a graph of signal modulation of a mobility device lighting apparatus according to an example embodiment of the present disclosure.
Figure 7:
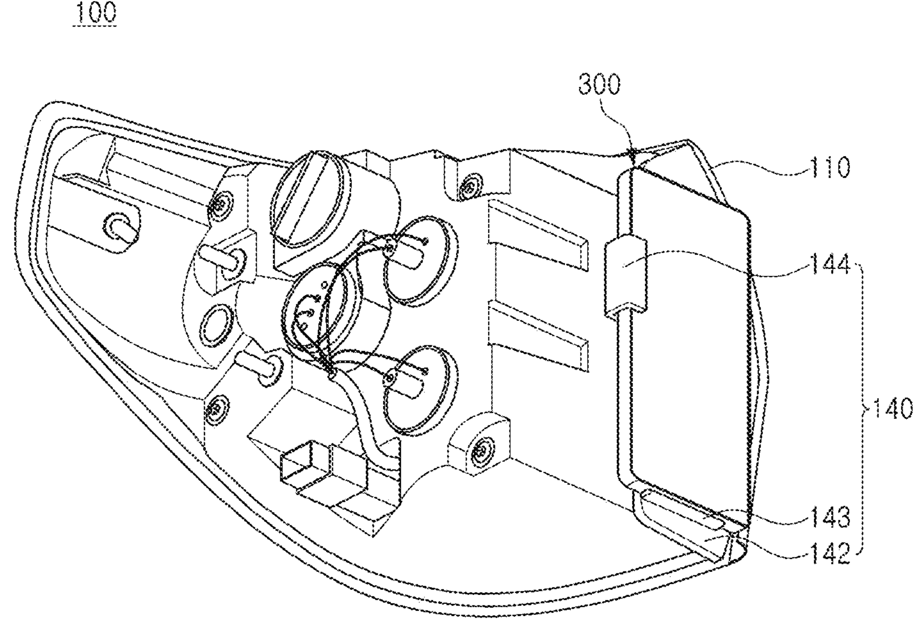
FIG. 7 is a perspective view of a portable terminal being charged by a primary of a mobility device lighting apparatus according to an example embodiment of the present disclosure.
Figure 8:
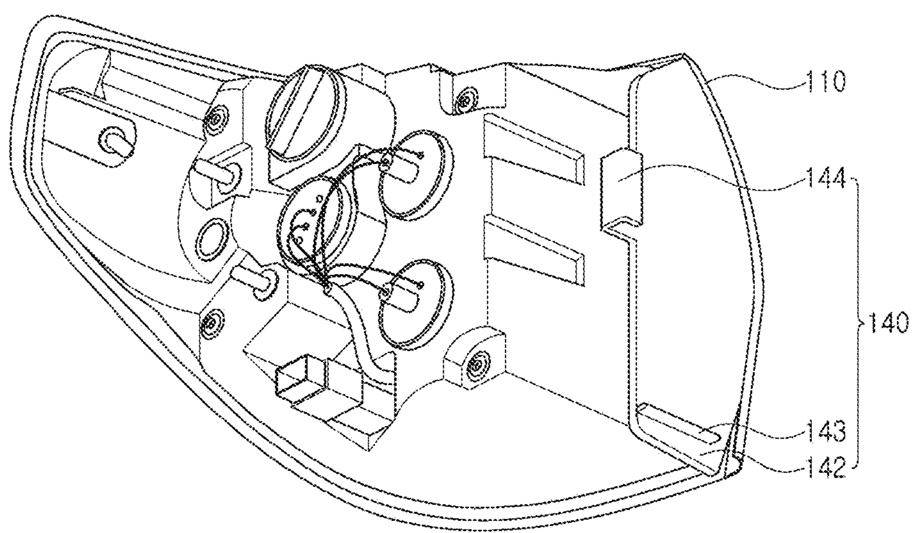
FIG. 8 is a perspective view of a primary of a mobility device lighting apparatus according to an example embodiment of the present disclosure.
Figure 9:
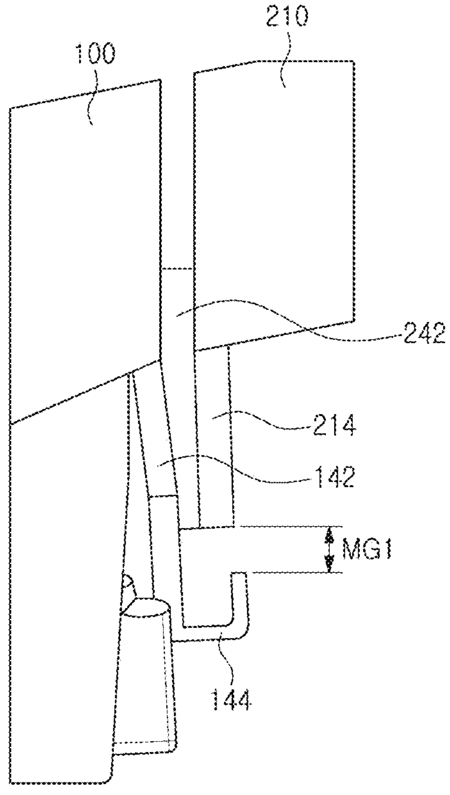
FIG. 9 is a diagram of a wireless power transmission coil portion of a mobility device lighting apparatus according to an example embodiment of the present disclosure, when viewed in a vertical direction.
Figure 10:
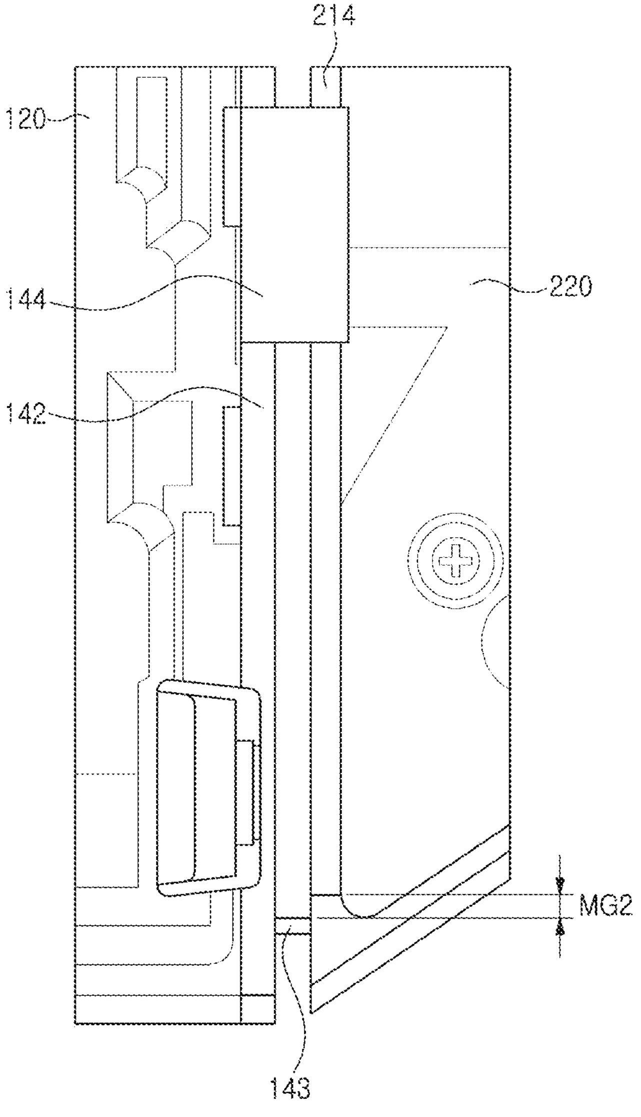
FIG. 10 is a diagram of a wireless power transmission coil portion of a mobility device lighting apparatus according to an example embodiment of the present disclosure, when viewed in a front-to-rear direction.

Referring to FIGS. 4 and 6, the controller 235 of the power receiver 230 may modulate the power for wireless power transmissions, based on at least one of an amplitude shift keying modulation (ASK modulation) method, a frequency shift keying modulation (FSK modulation) method, or a phase shift keying modulation (PSK modulation) method, but the present disclosure is not limited thereto.

The ASK modulation method may be a method of modulating message bits of data into an amplitude of the power for wireless power transmissions, and amplitudes, corresponding to 0 and 1 of the message bits, may be different from each other.

The FSK modulation method may be a method of modulating message bits of data into a frequency of the power for wireless power transmissions, and frequencies, corresponding to 0 and 1 of the message bits, may be different from each other.

The PSK modulation method may be a method of modulating message bits of data into a phase of the power for wireless power transmissions, and phases, corresponding to 0 and 1 of the message bits, may be different from each other.

Figure 13:
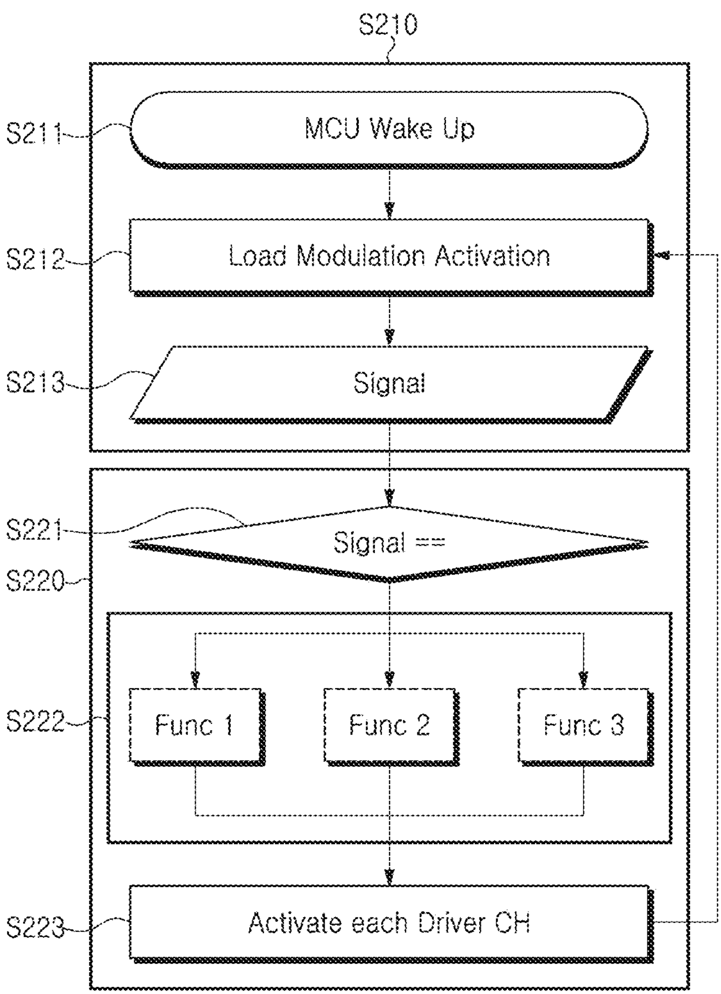
FIG. 13 is a flowchart of a method of controlling a (secondary) mobility device lighting apparatus according to an example embodiment of the present disclosure.

Referring to FIGS. 4 and 13, the (secondary) mobility device lighting apparatus 200 may perform a load modulation operation S210 and a control signal reception operation S220. In the load modulation operation S210, the controller 235 of the power receiver 230 may wake up (S211), may activate a load modulation operation (S212), and may output a signal for the load modulation operation (S213). In the control signal reception operation (S220), the controller 235 of the power receiver 230 may detect at least one of an amplitude, a frequency, or a phase of the power for wireless power transmissions (S221), and may generate light emission portion driving information Func1, Func2, and Func3 corresponding to detection results (S222). The light emission driver 220 may drive the light emission portion 210 according to the driving information (S223).

Figure 5:
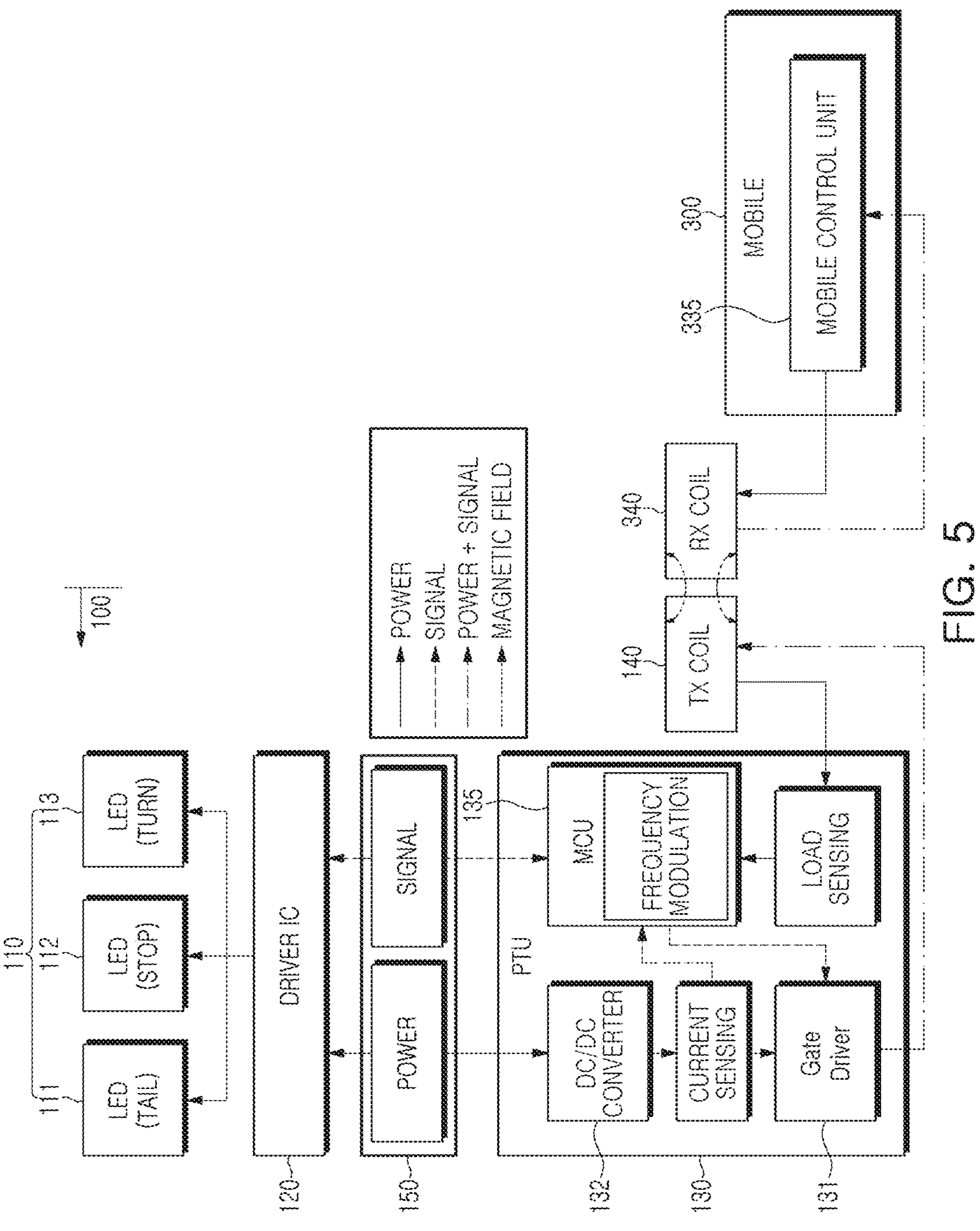
FIG. 5 is a block diagram of a portable terminal being charged by a primary of a mobility device lighting apparatus according to an example embodiment of the present disclosure.

Referring to FIGS. 4 and 5, the controller 235 of the power receiver 230 may modulate a load of the wireless power reception coil portion 240 in response to the power for wireless power transmissions received from the wireless power reception coil portion 240. For example, the load may include impedance (for example, resistance, capacitance, or inductance), and the controller 235 may modulate the load of the wireless power reception coil portion 240 by switching whether an impedance element that may be included in the power receiver 230 is electrically connected to the wireless power reception coil portion 240.

The controller 135 of the power transmitter 130 may sense a load of the wireless power transmission coil portion 140 (for example, perform signal analysis). When the load of the wireless power reception coil portion 240 is modulated, the load of the wireless power transmission coil portion 140 may also be modulated. For example, the load may include impedance (for example, resistance, capacitance, or inductance), the controller 135 may sense a voltage and/or a current of the wireless power transmission coil portion 140, and may analyze the voltage and/or the current (for example, perform load calculation based on a peak value or an average value of a signal, and inductance calculation according to an envelope analysis of a signal).

The controller 135 of the power transmitter 130 may select one of a wireless charging control mode and a wireless light emission control mode, based on a load sensing result.

For example, the controller 135 of the power transmitter 130 may determine whether to transmit the second control signal SIGNAL through the wireless power transmission coil portion 140 according to mode selection.

For example, when the wireless power reception coil portion 240 is magnetically coupled to the wireless power transmission coil portion 140, the controller 135 may select a wireless light emission control mode for wirelessly controlling light emission of the light emission portion 210. Accordingly, the power transmitter 130 may activate an operation for transmitting the second control signal SIGNAL to the wireless power reception coil portion 240.

For example, when the wireless power reception coil portion 240 is not magnetically coupled to the wireless power transmission coil portion 140, the controller 135 may select the wireless charging control mode. Accordingly, the power transmitter 130 may deactivate an operation for transmitting the second control signal SIGNAL to the wireless power reception coil portion 240.

In the wireless charging control mode, when the wireless power reception coil portion 240 is not magnetically coupled to the wireless power transmission coil portion 140, a coil portion 340 of a mobile device 300 may be magnetically coupled to the wireless power transmission coil portion 140. A mobile control unit 335 of the mobile device 300 may control the coil portion 340 in a wirelessly chargeable state, and the wireless power transmission coil portion 140 may transmit the power for wireless power transmissions to the coil portion 340 for wireless charging of the mobile device 300. The power for wireless power transmissions, received by the coil portion 340, may be used to charge a battery of the mobile device 300.

The controller 135 of the power transmitter 130 may convert the pre-conversion power POWER into the power for wireless power transmissions according to a preset specification (for example, a rated voltage or a rated current) corresponding to a selected mode. For example, a driving specification for the light emission portion 210 and a charging specification for the mobile device 300 may be different from each other, and the controller 135 may store information on the preset specification in advance. The power transmitter 130 may output the power for wireless power transmissions according to the driving specification (for example, a rated voltage or a rated current) for the light emission portion 210 when operating in the wireless light emission control mode, and may output the power for wireless power transmissions according to the charging specification (for example, a rated voltage or a rated current) for the mobile device 300 when operating in the wireless charging control mode.

Figure 12:
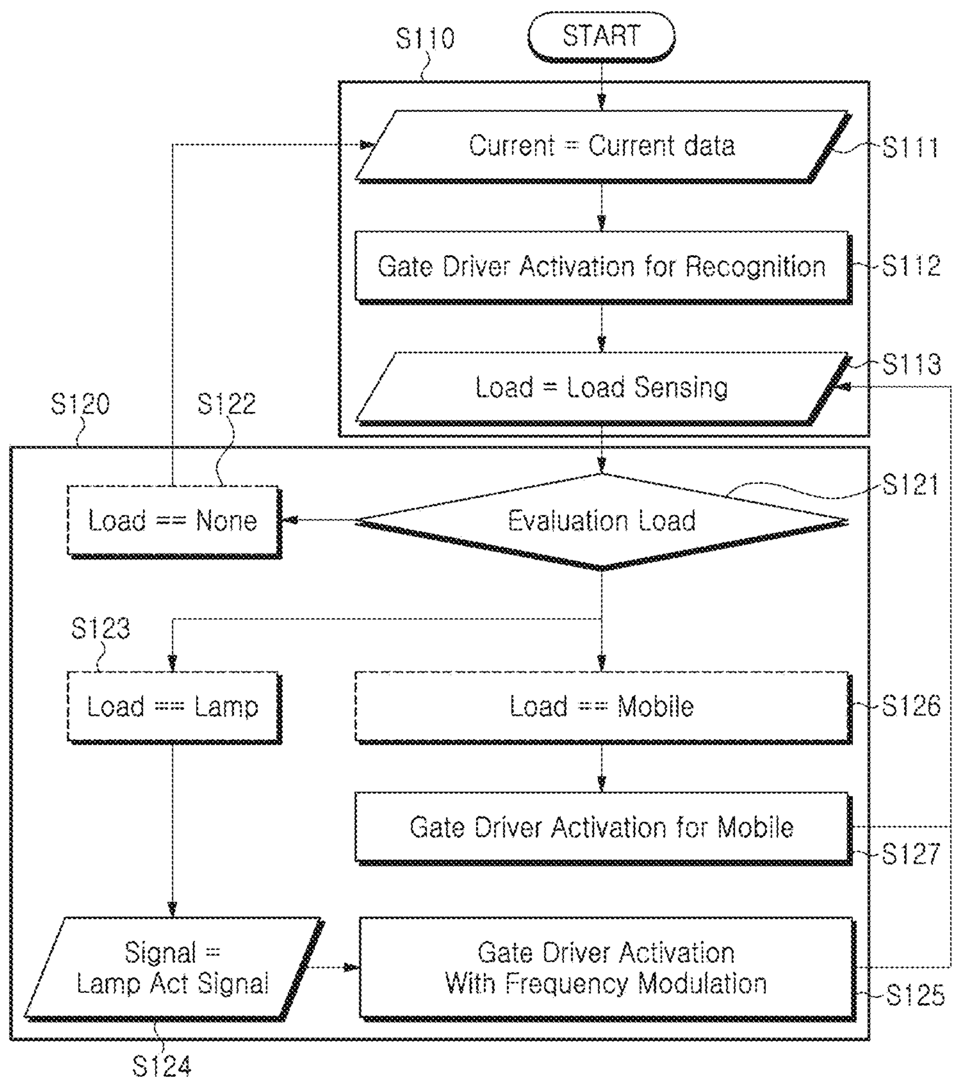
FIG. 12 is a flowchart of a method of controlling a (primary) mobility device lighting apparatus according to an example embodiment of the present disclosure.

Referring to FIGS. 4, 5, and 12, the (primary) mobility device lighting device 100 may include a load sensing operation S110 and a mode control operation S120. In the load sensing operation S110, the controller 135 of the power transmitter 130 may sense an output current of the DC/DC converter 132 (S111), may activate a sensing mode of the gate driver 131 (S112), and may sense a load of the wireless power transmission coil portion 140 (S113). In the mode control operation S120, the controller 135 of the power transmitter 130 may evaluate a load of the wireless power transmission coil portion 140 (S121), and may re-perform the load sensing operation S110 when the load corresponds a load in which there is no object to be magnetically coupled to the wireless power transmission coil portion 140 (S122). When the load corresponds to a load in which an object to be magnetically coupled to the wireless power transmission coil portion 140 is the wireless power reception coil portion 240 (S123), the controller 135 may determine to transmit the second control signal (S124), and may activate the wireless light emission control mode (modulation accompanied) of the gate driver 131 (S125). When the load corresponds to a load in which an object to be magnetically coupled to the wireless power transmission coil portion 140 is the mobile device 300 (S126), the controller 135 may activate the wireless charging control mode of the gate driver 131 (S127).

Referring to FIGS. 3 and 7 to 10, the wireless power transmission coil portion 140 may include a wireless power transmission coil 141 outputting a magnetic field, and may include a mount 142 disposed to overlap the wireless power transmission coil 141 in a magnetic field output direction of the wireless power transmission coil 141. The wireless power reception coil portion 240 may include a wireless power reception coil 241 and a coil cover 242.

The wireless power transmission coil 141 may be embedded in the mount 142, and the wireless power reception coil 241 may be embedded in the coil cover 242. For example, each of the wireless power transmission coil 141 and the wireless power reception coil 241 may have a form in which copper wires are wound on one layer or a form in which copper wires are stacked and wound on a plurality of layers.

The mount 142 and the coil cover 242 may have shapes (for example, a flat surface) matching each other, such as a flange. The mount 142 and the coil cover 242 may be formed of a material (for example, a plastic material or a molding material) having low permeability to allow a magnetic field to pass therethrough. The mount 142 may have seating support portions 143 and 144 on one surface of the mount 142.

The mobile device 300 may be disposed in a seating space on the one surface of the mount 142 so as to overlap a magnetic field output by the wireless power transmission coil 141. The seating support portions 143 and 144 may protrude to an edge of the seating space on the one surface of the mount 142, thereby preventing the mobile device 300 from being separated in a horizontal direction of the mount 142. The seating support portion 144 may be disposed to cover the edge of the seating space, thereby stably preventing the mobile device 300 from being separated from the mount 142.

For example, the seating support portion 143 may be spaced apart from an inner edge 214 of the light emission portion 210 by at least margins MG1 and MG2 such that the magnetic field of the wireless power transfer coil 141 is not interfered with by the light emission portion 210. For example, the seating support portion 143 may be implemented as a rib or a support ledge, and the seating support portion 144 may be implemented as a catch ledge.

Figure 11:
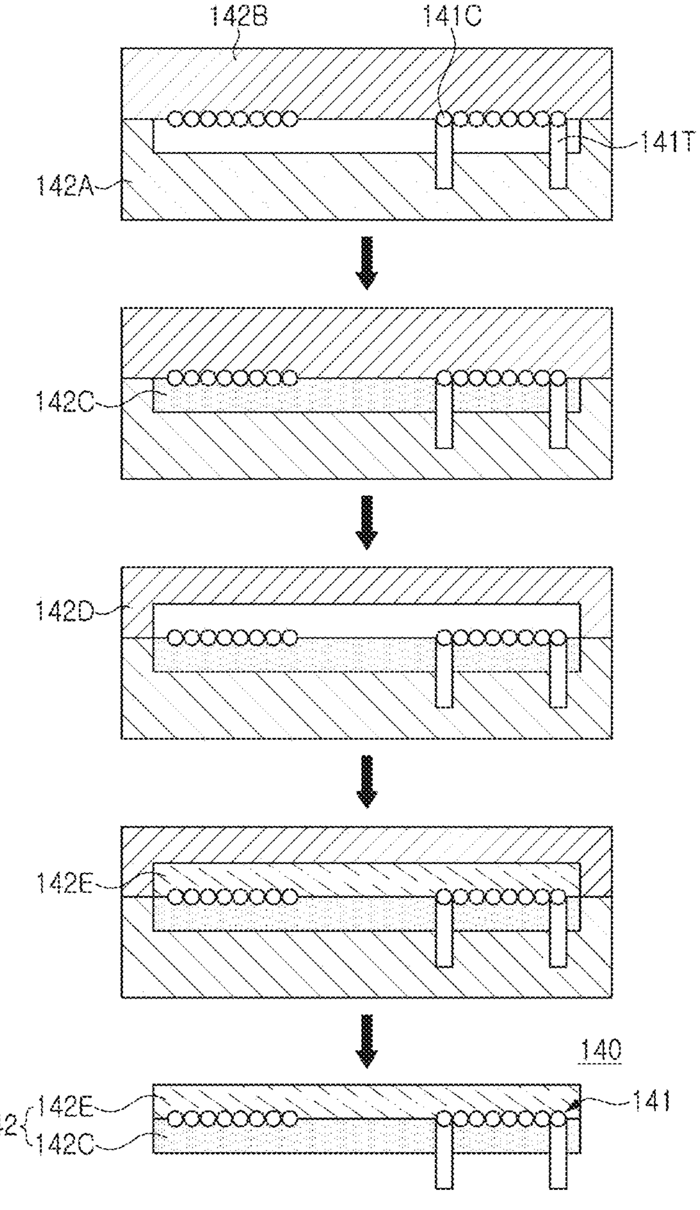
FIG. 11 is a process diagram of a method of manufacturing a wireless power transmission coil portion (and/or a wireless power reception coil portion) of a mobility device lighting apparatus according to an example embodiment of the present disclosure.

Referring to FIG. 11, a winding portion 141C of the wireless power transmission coil 141 may be embedded in the mount 142, and a lead-out end 141T of the wireless power transmission coil 141 may be lead out from the inside of the mount 142 to the outside of the mount 142. Accordingly, even when exposed to the outside of a mobility device, the wireless power transmission coil portion 140 may have a structure advantageous for preventing malfunction or damage (for example, deformation/corrosion of a coil) due to external environmental factors (for example, inflow of moisture/diffusion substances). The wireless power transmission coil portion 140 may be manufactured using plastic injection molding, but the present disclosure is not limited thereto.

For example, the winding portion 141C may be formed on a lower surface of a primary core 142B, and the lead-out end 141T may be formed in a cavity 142A. Thereafter, a lower layer 142C of the mount 142 may be filled in the cavity 142A, and the primary core 142B may be separated from the cavity 142A. Thereafter, a secondary core 142D may be disposed on an upper surface of the cavity 142A, and an upper layer 142E of the mount 142 may be filled in the secondary core 142D. Thereafter, the cavity 142A and the secondary core 142D may be separated from the mount 142.

In a mobility device lighting apparatus and a mobility device according to an example embodiment of the present disclosure, a wire connection structure for light emission may be omitted or reduced, such that a degree of design freedom may be increased, or the mobility device lighting apparatus and the mobility device may be advantageously implemented with a reduced size (and/or cost). For example, as the wire connection structure is omitted or reduced, the lighting apparatus may have a wider degree of design freedom, such as being disposed separately on a fixed part and a moving part of the mobility device. In addition, movement restrictions on the moving part due to the wire connection structure or inefficient (or unstable) implementation of the wire connection structure may be prevented.

In addition, the mobility device lighting apparatus and the mobility device according to an example embodiment of the present disclosure may be advantageous for implementing a structure that enables charging of a mobile device. For example, a mobility device driver may engage in outdoor activities and rest outdoors using a trunk (or frunk). In this case, the mobility device lighting apparatus and the mobility device may charge the mobile device of the driver during outdoor activities, and accordingly a user may not need to carry an additional device for charging the mobile device, and efforts required to set up the mobility device for charging may be reduced.

While example embodiments have been shown and described above, it will be apparent to those skilled in the art that modifications and variations could be made without departing from the scope of the present disclosure as defined by the appended claims.

The invention claimed is:

1. A mobility device lighting apparatus comprising:

a first light emission portion;

a first light emission driver configured to drive the first light emission portion;

a power transmitter configured to convert pre-conversion power into power for wireless power transmissions; and a wireless power transmission coil portion configured to receive the power for wireless power transmissions from the power transmitter;

wherein the power transmitter is configured to sense a load of the wireless power transmission coil portion and select, based on a load sensing result, one of a wireless charging control mode and a wireless emission control mode.

2. The mobility device lighting apparatus of claim 1, wherein the wireless power transmission coil portion is configured to output a magnetic field in a direction that is different from a light emission direction of the first light emission portion.

3. The mobility device lighting apparatus of claim 2, wherein the first light emission portion has a first surface configured to output light, a second surface of the first light emission portion surrounds the first light emission driver, the power transmitter, and the wireless power transmission coil portion, and the wireless power transmission coil portion is positioned at one edge of the second surface of the first light emission portion to output a magnetic field in a direction that is not parallel to a light emission direction of one edge of the first light emission portion.

4. The mobility device lighting apparatus of claim 2, wherein the wireless power transmission coil portion includes:

a wireless power transmission coil configured to output a magnetic field; and a mount overlapping the wireless power transmission coil in a magnetic field output direction of the wireless power transmission coil, the mount having a seating support portion on one surface of the mount.

5. The mobility device lighting apparatus of claim 4, wherein the seating support portion protrudes to an edge of a seating space on the one surface of the mount, and the seating support portion covers the edge of the seating space.

6. The mobility device lighting apparatus of claim 4, wherein the wireless power transmission coil is embedded in the mount, and a lead-out end of the wireless power transmission coil extends from an inside of the mount to an outside of the mount.

7. The mobility device lighting apparatus of claim 1, further comprising:

a mobility device connector configured to receive a first control signal and the pre-conversion power from a mobility device, wherein the first light emission driver is configured to drive the first light emission portion based on the first control signal.

8. The mobility device lighting apparatus of claim 7, wherein the mobility device connector is configured to further receive a second control signal from the mobility device, and the wireless power transmission coil portion is configured to output a magnetic field for transmitting the second control signal.

9. The mobility device lighting apparatus of claim 8, wherein the power transmitter is configured to modulate the power for wireless power transmissions by at least one of an amplitude, a frequency, or a phase corresponding to the second control signal, such that the wireless power transmission coil portion transmits the power for wireless power transmissions and the second control signal together.

10. The mobility device lighting apparatus of claim 8, wherein the power transmitter is further configured to:

determine whether to transmit the second control signal through the wireless power transmission coil portion according to mode selection.

11. The mobility device lighting apparatus of claim 7, wherein the power transmitter is further configured to:

convert the pre-conversion power into the power for wireless power transmissions according to a preset specification corresponding to a selected mode.

12. The mobility device lighting apparatus of claim 1, further comprising:

a wireless power reception coil portion configured to receive power and a control signal through wireless power transmission;

a power receiver configured to receive the power from the wireless power reception coil portion and to convert the power into converted power;

a second light emission portion configured to emit light, based on the power converted by the power receiver; and a second light emission driver configured to drive the second light emission portion, based on the control signal.

13. The mobility device lighting apparatus of claim 12, wherein the wireless power reception coil portion is configured to receive the power and the control signal in a direction that is not parallel to a light emission direction of the second light emission portion.

14. The mobility device lighting apparatus of claim 12, wherein the power receiver is configured to detect at least one of an amplitude, a frequency, or a phase of the power received by the wireless power reception coil portion to receive the control signal.

15. The mobility device lighting apparatus of claim 12, wherein the power receiver is configured to modulate a load of the wireless power reception coil portion in response to the power received from the wireless power reception coil portion.

16. A mobility device comprising:

a fixed part including a primary mobility device lighting apparatus; and a moving part including a secondary mobility device lighting apparatus;

wherein the primary mobility device lighting apparatus includes:

a power transmitter configured to convert pre-conversion power into power for wireless power transmissions; and a wireless power transmission coil portion configured to receive the power for wireless power transmissions from the power transmitter; and wherein the secondary mobility device lighting apparatus includes:

a wireless power reception coil portion magnetically coupled to the wireless power transmission coil portion and configured to receive the power for wireless power transmissions; and a power receiver configured to receive the power for wireless power transmissions from the wireless power reception coil portion, and to convert the power for wireless power transmissions into converted power;

wherein the power transmitter is configured to sense a load of the wireless power transmission coil portion and select, based on a load sensing result, one of a wireless charging control mode and a wireless emission control mode.

17. The mobility device of claim 16, further comprising:

a controller configured to output a first control signal and a second control signal to the primary mobility device lighting apparatus;

wherein the primary mobility device lighting apparatus further includes a mobility device connector configured to receive the first control signal and the second control signal; and wherein the wireless power transmission coil portion is configured to transmit the second control signal to the wireless power reception coil portion.

18. The mobility device of claim 17, wherein:

the power transmitter is configured to modulate the power for wireless power transmissions by at least one of an amplitude, a frequency, or a phase corresponding to the second control signal such that the wireless power transmission coil portion transmits the power for wireless power transmissions and the second control signal together; and the power receiver is configured to detect at least one of an amplitude, a frequency, or a phase of the power for wireless power transmissions to receive the second control signal.

19. The mobility device of claim 17, wherein:

the power receiver is configured to modulate a load of the wireless power reception coil portion in response to the power for wireless power transmissions received from the wireless power reception coil portion; and the power transmitter is configured to:

determine whether to transmit the second control signal through the wireless power transmission coil portion according to mode selection; and convert the pre-conversion power into the power for wireless power transmissions according to a preset specification corresponding to a selected mode.

20. The mobility device of claim 16, wherein:

the primary mobility device lighting apparatus is configured to output light to a rear of the mobility device;

the moving part moves to determine whether to open an internal space of the mobility device; and the wireless power reception coil portion is configured such that whether the wireless power reception coil portion is magnetically coupled to the wireless power transmission coil portion varies depending on movement of the moving part.

* * * * *